US009840044B2

(12) United States Patent
Campbell et al.

(10) Patent No.: US 9,840,044 B2
(45) Date of Patent: Dec. 12, 2017

(54) CONTROLLED TRANSLATION METHOD OF AFFIXING A TERMINATION TO A TENSILE MEMBER

(71) Applicants: Richard V Campbell, Havana, FL (US); David M Gladwin, Havana, FL (US)

(72) Inventors: Richard V Campbell, Havana, FL (US); David M Gladwin, Havana, FL (US)

( * ) Notice: Subject to any disclaimer, the term of this patent is extended or adjusted under 35 U.S.C. 154(b) by 494 days.

(21) Appl. No.: 14/611,350

(22) Filed: Feb. 2, 2015

(65) Prior Publication Data

US 2016/0221258 A1 Aug. 4, 2016

(51) Int. Cl.
*B32B 41/00* (2006.01)
*B29C 65/00* (2006.01)
(Continued)

(52) U.S. Cl.
CPC .............. *B29C 66/69* (2013.01); *B29C 65/48* (2013.01); *B29C 65/54* (2013.01); *B29C 65/561* (2013.01); *B29C 65/72* (2013.01); *B29C 65/7841* (2013.01); *B29C 66/112* (2013.01); *B29C 66/1286* (2013.01); *B29C 66/12821* (2013.01); *B29C 66/344* (2013.01); *B29C 66/5344* (2013.01); *B29C 66/742* (2013.01); *B29C 66/9121* (2013.01); *B29C 66/91221* (2013.01); *B29C 66/95* (2013.01); *F16G 11/00* (2013.01); *B29C 65/485* (2013.01);
(Continued)

(58) Field of Classification Search
CPC ..... B29C 66/69; B29C 66/5344; B29C 65/54; B29C 66/91221; B29C 66/9121; B29C 66/742; B29C 66/1286; B29C 66/344; B29C 65/561; B29C 66/12821; B29C 66/112; B29C 65/7841; B29C 65/72; B29C 65/48; B29C 66/95; B29C 65/4815; B29C 65/542; B29C 65/546; B29C 65/485; B29C 65/4845; B29C 65/4835; F16G 11/00; B29L 2031/707
USPC .................... 156/64, 66, 350, 351, 378, 379
See application file for complete search history.

(56) References Cited

U.S. PATENT DOCUMENTS

| 3,660,887 | A | * | 5/1972 | Davis | ....................... | B29C 39/10 174/176 |
| 2003/0010966 | A1 | * | 1/2003 | Sjostedt | ................... | B32B 1/08 254/231 |
| 2006/0096089 | A1 | * | 5/2006 | Campbell | ............. | F16G 11/042 29/857 |

* cited by examiner

*Primary Examiner* — Michael N Orlando
*Assistant Examiner* — Joshel Rivera
(74) *Attorney, Agent, or Firm* — J. Wiley Horton

(57) ABSTRACT

A method for creating a termination by attaching some kind of fitting to the end of a tensile member such as a cable. The end fitting is provided with an internal cavity. The cavity has a proximal portion that is adjacent to the area where the tensile member exits the fitting and a distal portion on its opposite end. A length of the tensile member's filaments is placed within this expanding cavity and infused with liquid potting compound. The method exploits the characteristic of a liquid potting compound as it transitions to a solid. The potting compound in one portion of the cavity is typically transitioned to a solid at a more rapid rate than other portions. Once the potting compound in one portion of the cavity has transitioned sufficiently to hold the filaments at the desired level, tension is placed on the tensile member and a small linear displacement may be imposed on the tensile member. This linear displacement tends to pull the
(Continued)

filaments residing in the potting compound into better alignment and improve load sharing.

25 Claims, 16 Drawing Sheets

(51) Int. Cl.
*B29C 65/48* (2006.01)
*B29C 65/54* (2006.01)
*B29C 65/56* (2006.01)
*B29C 65/72* (2006.01)
*B29C 65/78* (2006.01)
*F16G 11/00* (2006.01)
*B29L 31/00* (2006.01)

(52) U.S. Cl.
CPC ...... *B29C 65/4815* (2013.01); *B29C 65/4835* (2013.01); *B29C 65/4845* (2013.01); *B29C 65/542* (2013.01); *B29C 65/546* (2013.01); *B29L 2031/707* (2013.01)

CONTROLLED TRANSLATION METHOD OF AFFIXING A TERMINATION TO A TENSILE MEMBER

CROSS-REFERENCES TO RELATED APPLICATIONS

This non-provisional patent application claims the benefit of an earlier-filed provisional application. The first provisional application was assigned Ser. No. 61/934,172. It listed the same inventor.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of tensile strength members. More specifically, the invention comprises a method for affixing a termination to an end of a tensile strength member such as a cable.

2. Description of the Related Art

Tensile strength members must generally be connected to other components in order to be useful. A flexible cable provides a good example. The cable must generally include some type of end-fitting so that it can be transmit a load. For example, a cable used in a hoist generally includes a lifting hook on its free end. This lifting hook may be rigged to a load. The assembly of an end-fitting and the portion of the cable to which it is attached is generally called a "termination."

A tough steel lifting hook is commonly attached to a wire rope to create a termination. A "spelter socket" is often used to create the termination. The "spelter socket" involves an expanding cavity within the end-fitting. A length of the wire rope is slipped into this cavity and the individual wires are splayed apart. A liquid potting compound is then introduced into the expanding cavity with the wires in place. The liquid potting compound transitions to a solid over time and thereby locks the wire rope into the cavity.

The potting compound used in a spelter socket is traditionally molten lead and—more recently—is more likely a high-strength epoxy. However, the term "potting compound" as used in this description means any substance which transitions from a liquid to a solid over time. Examples include molten lead, thermoplastics, UV-cure or thermoset resins (such as two-part polyesters or epoxies). Other examples include plasters, ceramics, and cements. The term "solid" is by no means limited to an ordered crystalline structure such as found in most metals. In the context of this invention, the term "solid" means a state in which the material does not flow significantly under the influence of gravity. Thus, a soft but stable wax is yet another example of such a solid.

The prior art approaches to adding a termination are explained in detail in commonly-owned U.S. Pat. No. 7,237,336, which is hereby incorporated by reference. An exemplary termination is shown in FIGS. 1-4. FIG. 1 shows a cable 10 made from advanced high-strength synthetic filaments. Many different materials are used for these filaments. These include DYNEEMA, SPECTRA, TECHNORA, TWARON, KEVLAR, VECTRAN, PBO, carbon fiber, and glass fiber (among many others). In general the individual filaments have a thickness that is less than that of human hair. The filaments are very strong in tension, but they are not very rigid. They also tend to have low surface friction. These facts make such synthetic filaments difficult to handle during the process of adding a termination and difficult to organize. The present invention is particularly applicable to terminations made of such high-strength filaments, for reasons which will be explained in the descriptive text to follow. While the invention could in theory be applied to older cable technologies—such as wire rope—it likely would offer little advantage and the additional time and expense of implementing the invention would not be worthwhile. Thus, the invention is not really applicable to wire rope and other similar cables made of very stiff elements.

Those skilled in the art will know that cables made from synthetic filaments have a wide variety of constructions. The example shown in FIG. 1 has a parallel core of filaments surrounded by a jacket of braided filaments. In other cases the cable may be braided throughout. In still other examples the cable construction may be: (1) an entirely parallel construction enclosed in a jacket made of different material, (2) a helical "twist" construction, or (3) a more complex construction of multiple helices, multiple braids, or some combination of helices and braids.

In the example of FIG. 1, the objective is to attach anchor 18 to the end of a tensile strength member in order to create a termination that can then transmit a load. In this example the particular tensile strength member is in fact a cable. Throughout this disclosure cables will be used as an example of a tensile strength member. However the invention should not be viewed as being limited to cables. The term "tensile strength member" or "tensile member" encompasses cables and sub-components of cables such as strands. The reader is referred to commonly-owned U.S. Pat. No. 8,371,015 for more detailed descriptions regarding the application of an attachment to a sub-component of a larger cable. The invention also encompasses non-cable structures intended to carry loads in tension.

Likewise, the term "anchor" should be viewed broadly to encompass virtually anything that can be attached to a cable. The anchor would ordinarily include some features facilitating attachment—such as a hook or threads. These features are conventional and have not been illustrated. Anchor 18 is instead depicted as a simple cylinder with a cavity 20 passing along its central axis.

FIG. 2 shows a sectional view through anchor 18 with the cable in position for securing to the anchor. A length of the cable has been passed through cavity 20. The reader will note that cavity 20 expands as one proceeds from the portion of the anchor facing the length of cable (the "proximal" end, which is the bottom end in the orientation of the view) toward the portion of the anchor facing in the opposite direction (the "distal" end, which is the top end in the orientation of the view). The expanding cavity in this example is a linear taper between two straight portions—all joined by fillets. Differing wall profiles may be used to create a wide variety of expanding cavities.

A portion of the cable filaments are separated to create splayed filaments 12. Liquid potting compound is then introduced into cavity 20 via a wide variety of methods. These include: (1) "painting" or otherwise wetting the filaments with potting compound and then sliding the anchor into position over the painted filaments, (2) positioning the splayed filaments in the cavity and then pouring in potting compound, (3) pre-wetting the filaments in a separate mold designed to wet the filaments, and (4) injecting pressurized potting compound into the cavity. However the potting compound is introduced, the splayed filaments remain within cavity 20 while the potting compound hardens. Once it has hardened the result is a mechanical interlock between the filament-reinforced "plug" of solid material and the cavity. Tension applied to the cable will be transferred to the anchor via the mechanical interference.

The anchor applied will usually be permanent. However, it is also possible to apply a removable anchor such as a two-piece or dissolvable design that in itself forms a sort of mold. This can then be removed and another anchor device attached to the "molded" composite section of filaments and solidified potting compound. As can be imagined by those skilled in the art, there are many ways in which this multi-step process could be devised to carry out the inventive method.

Of course, if enough tension is applied the termination will fail. Ideally failure would occur at 100% of the breaking stress of each individual termination. This would be a 100% efficient termination in which the termination hardware and method of termination did not detract from the performance potentially available in the filament material itself. In reality terminations fail below 100% of the filament strength and in some cases they fall far below it. FIGS. 3 and 4 serve to illustrate some of the reasons for this phenomenon.

FIG. 3 depicts a sectional view in which anchor 18 has been sectioned to reveal potted region 14 lying within the cavity in the anchor's interior. The cavity is defined by cavity wall 22—which is a profile revolved around central axis 24. It is not essential that the cavity be radially symmetric but most such cavities are radially symmetric. Proximal end 54 is the end of the anchor where the cable emerges. Distal end 56 is the opposite end.

The solid "plug" in potted region 14 may be conceptually divided into several regions. These are extended region 34, distal region 32, middle region 30, neck region 28, and transition region 26 (some terminations may be readily described using fewer regions and as few as only two—the distal region and the neck region). Transition region 26 represents the area where the freely-flexing filaments emerge from the potted region. Extended region 34 (which may not always be present) represents a region beyond the filaments that is 100% solidified potting compound. Distal region 32 represents the region containing filaments that is closest to the distal end of the anchor. The neck region contains filaments and is in the vicinity of the proximal end of the anchor. The behavior of these differing regions differs based on many factors, including: (1) the size of the cable, (2) the type of potting compound used, and (3) the temperature of the components during the transition of the potting compound to a solid.

FIG. 4 shows a depiction of filaments 38 as they lay locked within the solidified potting compound. This view illustrates one of the significant problems of the potting approach. Once the filaments are placed within the cavity in the anchor, it is very difficult to control their orientation with any specificity. The reader will note that the filaments are roughly arrayed about the anchor's central axis and roughly splayed into a fan. However, each individual filament tends to bend and slew in a random fashion. The random nature of this variance reduces the overall breaking strength of the termination and introduces variability in breaking strength from one termination to the next (since some will have better filament alignment than others).

The depiction of FIG. 4 shows only a few filaments for visual clarity. An actual cable may have several thousand to several million such filaments in the potted region. It is not possible to neatly arrange the filaments because there is no way to grip and hold them. One could conceptually improve the alignment by adding tension to the cable while the potting compound is still in a liquid state, but of course this action would simply pull the wetted filaments out of the anchor.

Another known problem is the difference in the filament-to-potting-compound ratio for different regions of the cavity. The distal extreme of the cavity tends to be rich in liquid potting compound and lean on filaments (liquid-rich region 40 in the view). The proximal extreme is just the opposite—packed with filaments with only a small amount of liquid compound seeping or wicking into the voids (liquid-lean region 42 in the view).

Most potting compounds are cross-linking polymers—such as epoxies. When the two constituents of such compounds are mixed an exothermic reaction is produced. The cross-linking rate is highly dependent upon temperature. To some extent the ultimate strength of the cross-linked solid is dependent upon temperature as well. Some heat is desirable but too much heat tends to produce short polymer-chain length.

Looking again at FIG. 4, those knowledgeable of exothermic reactions will perceive that the heating rate will vary within the potted region. In the liquid-rich region 40 the temperature will tend to rise more rapidly than in the liquid-lean region and the cross-linking will occur more rapidly (though the reader should note that for some potting compounds "rapid" may mean several hours up to a day or more). In the liquid-lean region 442 (typically the neck or transition regions), however, most of the volume is consumed by the filaments themselves. Only small "slivers" of potting compound are present and the heat of reaction in these slivers is largely absorbed in heating the filaments. Thus, the temperature in liquid-lean region rises slowly and the cross-linking process occurs slowly.

The local build-up of heat is not easily dissipated because the potting compounds and the filaments themselves tend to be good thermal insulators. This would not be true for a traditional cable made of wire filaments. Because steel is a good thermal conductor, traditional cables do not tend to create a significant temperature variation during the potting process.

Another phenomenon existing in the cure process is viscosity variation. This is particularly true for a cross-linking potting compound (though true to some extent for other compounds). When the liquid potting compound begins to heat up in a given area, its viscosity typically drops and it tends to ooze and fill voids more readily. In addition, the decreased viscosity allows the filaments to move more freely within the liquid potting compound. However, as the solid transition continues the viscosity rises and eventually rises a great deal. Thus, for many potting compounds, the viscosity at the initial stage will fall, then rise and solidification occurs.

The present invention seeks to exploit these existing phenomena and in some instances—where the phenomena do not arise naturally—the present invention seeks to create them.

BRIEF SUMMARY OF THE PRESENT INVENTION

The present invention comprises a method for creating a termination by attaching some kind of fitting to the end of a tensile strength member such as a synthetic filament cable or a strand thereof. The end fitting is provided with an internal cavity, which will often but not always be an expanding cavity. The cavity has a proximal portion that is adjacent to the area where the tensile member exits the fitting and a distal portion on its opposite end. A length of the tensile member's filaments is placed within this expanding cavity and infused with liquid potting compound. The method exploits the characteristic of a liquid potting compound as it transitions to a solid.

In the inventive method the potting compound in one portion of the cavity is transitioned to a solid at a more rapid rate than the rest of the cavity. Once the portion of the potting compound has transitioned sufficiently to hold the filaments, tension is placed on the tensile member and a small linear displacement may be imposed on the tensile member. The linear displacement is parallel to the tensile member's central axis. This linear displacement tends to pull the filaments residing in the potting compound straight. It also tends to produce more equal load sharing among the filaments.

The appropriate condition for the potting compound may be determined in a variety of ways. One simple way is to monitor the temperature of the resin or anchor. Tension and or a translated position is preferably maintained while the potting compound transitions completely to a solid. A rotational motion may be imposed on the tensile member as well.

Figure 1:
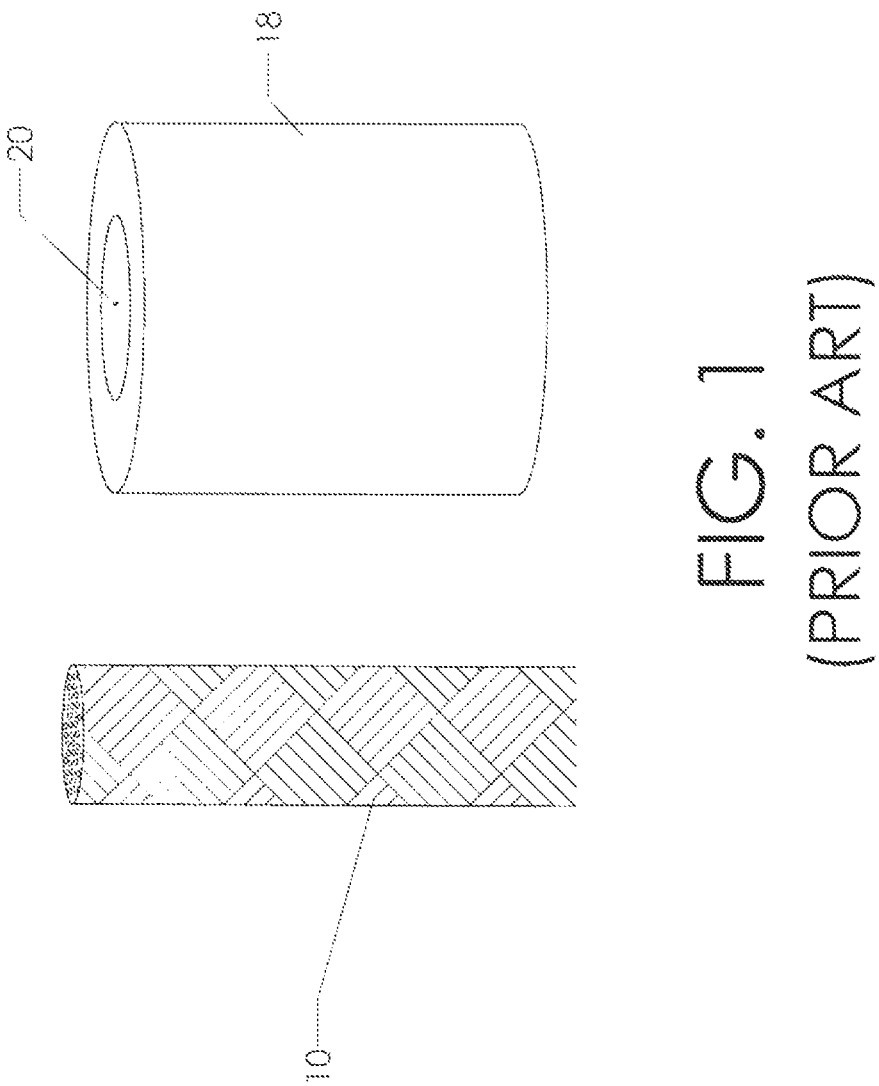
FIG. 1 is a perspective view, showing a prior art linear tensile member (a cable) and a prior art end fitting (an anchor).
Figure 2:
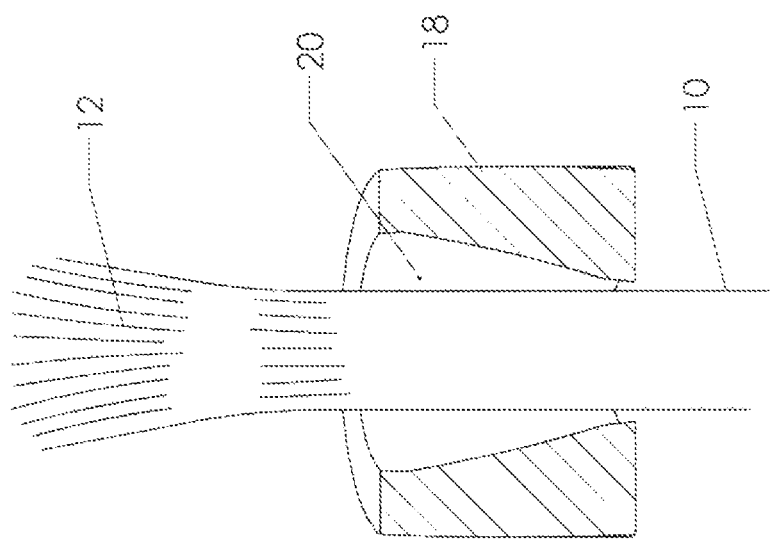
FIG. 2 is a partial sectional view, showing a prior art anchor being installed on a cable.

REFERENCE NUMERALS IN THE DRAWINGS 10 cable
12 splayed filaments
18 anchor
20 cavity
22 cavity wall
24 central axis
26 transition region
28 neck region
30 middle region
32 distal region
34 extended region
36 unpotted fibers
38 filament
40 liquid-rich region
42 liquid-lean region
44 cable clamp
46 anchor clamp
48 cable receiver
50 cable receiver
52 retaining plate
54 proximal end
56 distal end
58 thermocouple
60 thermocouple
62 thermocouple
64 seal plate
66 female thread
68 spike
69 plug
70 male thread
72 distal heater
74 middle heater
76 proximal heater
78 auxiliary anchor
80 auxiliary potted region
82 severed filaments
84 auxiliary cavity

DETAILED DESCRIPTION OF THE INVENTION

The present invention takes advantage of the transition properties of the potting compound. Referring back to FIG. 3, the reader will recall that distal region 32 has a significantly higher ratio of potting compound to filaments than neck region 28. This is true because the cross sectional area of the filaments is the same for both regions, but the cross-sectional area of the expanding cavity is larger in distal region 32. Thus, in distal region 32 the gaps between the filaments are larger and these gaps tend to be filled by the liquid potting compound.

If a potting compound has an exothermic cross-linking transformation (common for epoxies, polyesters, and many other compounds), then more heat will be generated in distal region 32 as compared to neck region 28. This is true because the distal region has a higher concentration of liquid potting compound and a lower concentration of inert filaments tending to absorb the heat produced. The result is that the temperature will rise faster in distal region 32. The heating process tends to build upon itself since both the potting compound and the filaments tend to be good thermal insulators. The temperature in the liquid-rich region will rise as the solidification reaction of the potting compound begins. The heat cannot easily be conducted away and the rising temperature causes the solidification process to accelerate. The acceleration of the reaction in turn generates still more heat. The situation is analogous to a "thermal runaway." One of the reasons that slow-transforming potting compounds are often used in large terminations is to prevent the build-up of too much heat, which can actually damage the synthetic filaments.

The rate of cross-linking of such potting compounds is dependent upon temperature. A higher temperature produces a higher cross-linking rate and thus a higher rate of transition to the solid state. The result is that the potting compound in the distal region transitions to the solid state before the potting compound in the neck region. The present invention takes advantage of this phenomenon and in some embodiments actually seeks to control and modify this phenomenon.

The potting compound within distal region 32 is allowed to "set" sufficiently to control the motion of the cable filaments while some amount of tension and/or translation is applied to the cable. The application of the tension and/or translation tends to improve two physical characteristics of the filaments within the potted region. These are: (1) filament alignment, and (2) effective load sharing. In most cases, the second phenomenon tends to be more important. However both will commonly impact breaking efficiency and repeatability.

Figure 4:
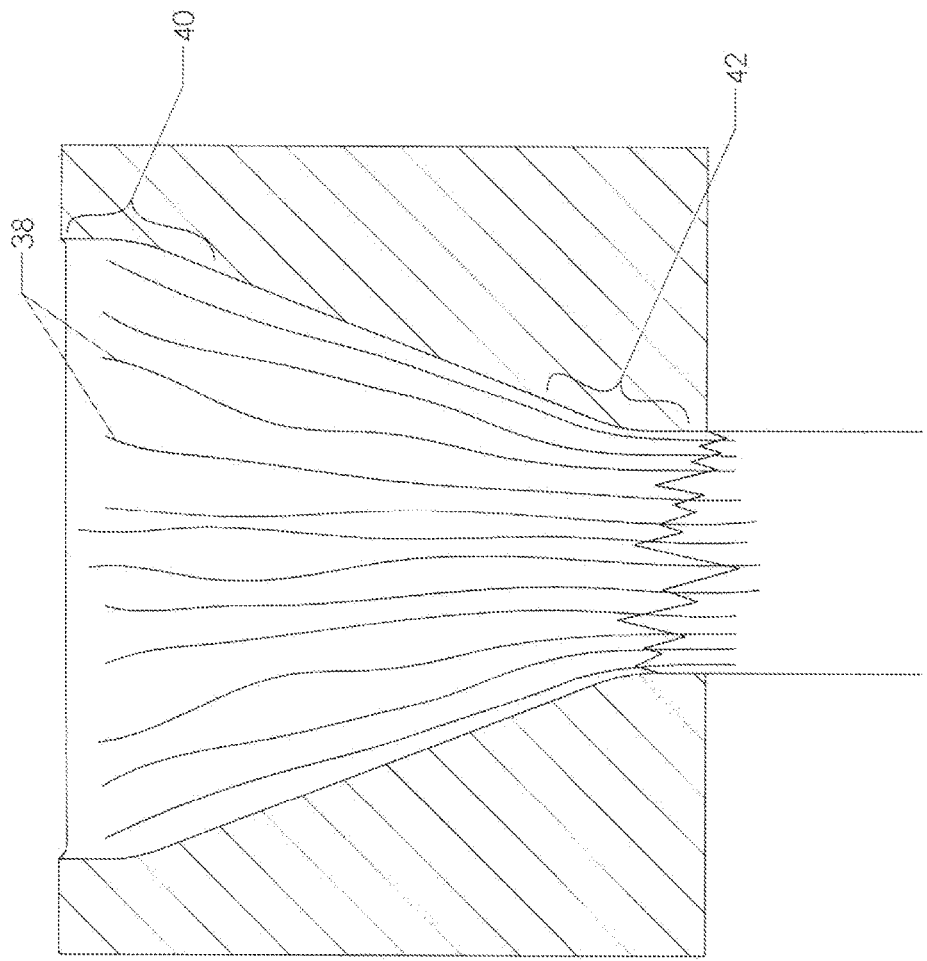
FIG. 4 is a sectional elevation view, showing the strand alignment in the embodiment of FIG. 3.

Looking at FIG. 4, the reader will observe how the filaments 38 within the liquid potting compound are oriented. They run roughly in the same direction as the central axis of the cable. However, many filaments are not completely straight. Instead, they curve and slew laterally with respect to the central axis of the cable (Some divergence is obviously desirable for an expanding anchor cavity but a disorganized "curvy" arrangement is not desirable). The inventive process improves filament alignment so that the unwanted curvature is reduced or eliminated in certain regions.

Of even greater importance is the variation in axial or longitudinal position of the filaments, which impacts the load sharing between filaments when the tensile member is loaded. This phenomenon is easier to explain than to illustrate. The millions of filaments typically found in a synthetic cable slip easily over one another as they have little surface friction. Normal handling of a cable will cause some filaments to extend a bit further at the cable's end than others. In addition, the small filament's lack of compressive and lateral stiffness means they are easily disoriented during any handling or even the effects of gravity.

High-performance synthetic filaments such as used in the present invention do not stretch much before breaking. Thus, when a cable is loaded in tension, the relatively short filaments carry a larger proportion of the load and the load is not shifted to other, longer filaments because the short filaments do not stretch much. Some long filaments may in fact be completely unloaded.

The present invention is useful in improving load sharing among the filaments so that—for example—the shorter filaments do not carry more load than the longer filaments. It is beneficial in many instances to apply tension to the cable and a small amount of displacement parallel to the cable's central axis while the filaments are still able to "slip through" the potting compound to some extent. Returning to FIG. 3, the invention monitors for a defined transition in the state of the potting compound toward the solid state. This defined transition can be a sufficient hardening to actually lock the filaments in place in a particular region. However, more commonly, the defined transition will be a point in the solidification state that is more like thick syrup. In that state, the applied tension allows the filaments to be pulled through the syrupy potting compound.

The alignment of the filaments is thereby improved. Even more importantly, however, shorter filaments will be translated further than longer filaments and the result will be that each filament is given a more equal share of the tensile load on the cable. A short thought experiment ably demonstrates this concept. Consider a first filament that has a long portion lying within the anchor cavity (the "long filament") so that the portion of the filament lying within the anchor cavity bends through several curves. Consider also a second filament that has a relatively short portion lying within the anchor cavity (the "short filament") so that the portion of the filament within the anchor cavity is already nearly straight before the inventive process is applied.

Once the potting compound in the anchor cavity region reaches a thick-syrup state tension is applied to the cable and a small and controlled amount of linear motion is permitted (The cable is dragged along its central axis in a direction tending to pull the cable out of the anchor). The "short filament" immediately comes under tension and its free end is dragged through the potting compound. The "long filament," on the other hand, straightens while its free end remains in place. Preferably, the amount of permitted translation is that amount which just begins to move the free end of the longest filament. Once this amount of translation is reached, the cable is held in place and the solidification of the potting compound continues to completion.

At the end of the process both the "short filament" and the "long filament" have been straightened. The free end of the "short filament" will be closer to transition region 26 than the free end of the "long filament" (since the free end of the short filament has been dragged along). However—once the potting compound is completely solidified—both filaments will tend to come immediately under load as soon as tension is applied to the cable. Thus, the load distribution between the two filaments has been improved.

The reader should note that in this thought experiment the term "short filament" refers to the length of that particular filament lying within the cavity of the anchor and the term "long filament" refers to the length of the other filament lying within the cavity. In fact, the overall length of both filaments may be identical and the overall length of the "short filament" might even be longer than the "long filament." In the thought experiment, longitudinal slippage or some other phenomenon has produced a state where more of the "long filament" is found within the anchor cavity than the "short filament." This is a common occurrence.

Figure 3:
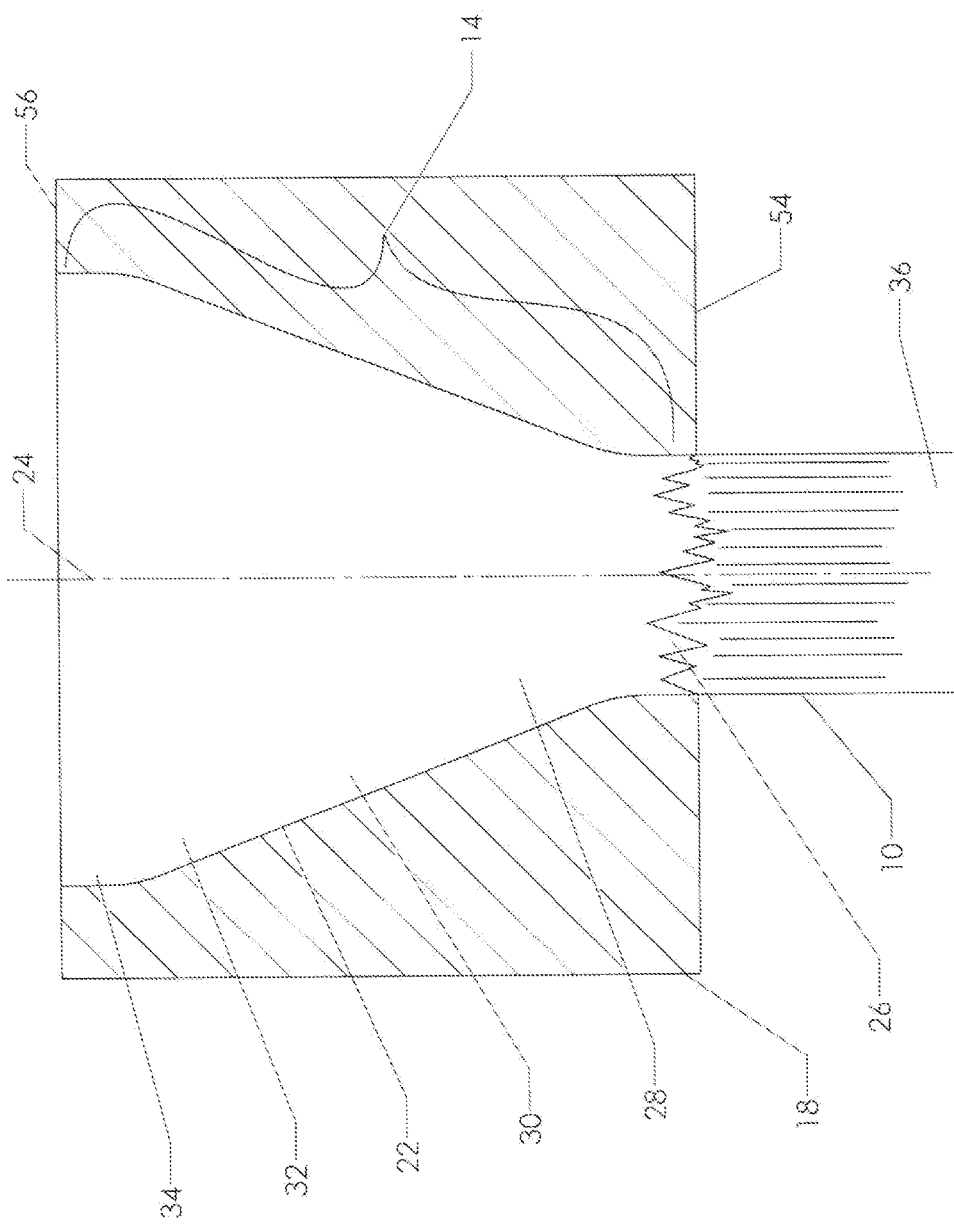
FIG. 3 is a sectional elevation view, showing the components of FIG. 2 after they have been potted into a complete termination.

Still looking at FIG. 3, the applied tension tends to pull the filaments within middle region 30, neck region 29, and transition region 26 straight and provide a more uniform load distribution. These changes produce enhanced overall breaking strength and improve other termination properties as well. Of note, these shifts in position are often ultra-small, such as hundredths or even thousandths of an inch. The depictions in the illustrations are exaggerated so that they can be seen. In reality the movements are quite small. However, they can have a very significant impact on performance. Tension is preferably maintained on the cable while the balance of the potting compound transitions sufficiently toward the solid state to hold the filaments in the alignment achieved.

The result is typically not perfect. The filaments will not be perfectly aligned nor perfectly organized. However, the inventive method does produce a significant advantage over the disorganized initial state of the filaments.

It is helpful for the reader to consider some of the properties of potting compounds. In particular, those compounds that transition from a liquid state to a solid state via an exothermic reaction. Many if not most of these compounds undergo a cross-linking transformation in which short molecular chains add additional links to become longer and longer. The longer molecular chains also tends to curl, creating cross links between adjacent chains. The result is a non-crystalline solid.

Those knowledgeable in the field will know that polymer cross-linking is not a single transformation like would be the case with many metals. Rather, the polymer tends to smoothly transition from one state to another. At a first time it may be a low-viscosity liquid that smoothly flows under the influence of gravity. At a second later time it may transition to a syrup-like consistency. At a still later time it may be a spongy solid. At a still later time it may ultimately transition to a hard solid (though never with a crystalline structure).

In addition, many cross-linking polymers go through a "B stage" transition explained previously. They start with one viscosity at ambient temperature when the two constituents are mixed. Heat produced by the exothermic reaction causes the viscosity to drop (in some instances substantially). Later, as the cross-linking progresses the viscosity climbs again and ultimately the cross-linking produces a solid.

The present invention does not need to wait for the potting compound in the distal region to transition to a hard solid. Even a thick "syrupy" consistency is enough to allow a small amount of tension and resulting translation to be applied to the cable. The process will vary depending upon many factors such as:

1. The potting compound used;
2. The mix ratio of the potting compound;
3. The size and shape of the cavity;
4. The anchor materials used;
5. The size, type, and distribution of the filaments;
6. Any internal hardware or components that rest in the cavity; and
7. The heating and/or cooling applied.

Figure 5:
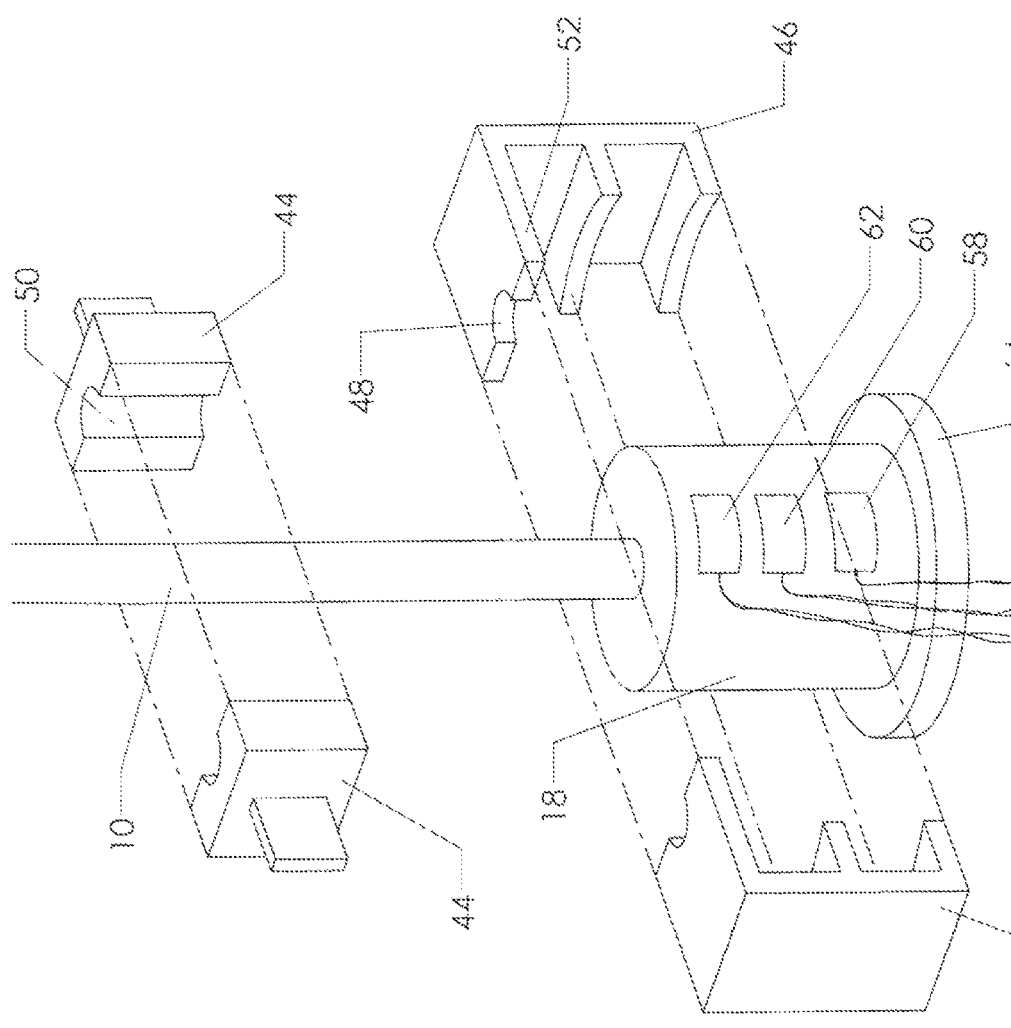
FIG. 5 is an exploded perspective view, showing components that may be used to apply tension to the cable while the potting compound transitions from a liquid to a solid.

Some specific examples will serve to aid the reader's understanding. FIG. 5 shows one exemplary apparatus configured to carry out the present invention. A length of filaments from cable 10 is placed in a cavity within anchor 18 as explained previously. The assembly of cable and anchor in this example has been inverted, so that the distal end of the anchor faces downward. Seal plate 64 is placed over the distal end to prevent the liquid potting compound running out the bottom of the assembly. The inversion of the assembly has advantages in many instances but the invention can be carried out in other orientations so the orientation shown in the view is not limiting.

A pair of anchor clamps 46 is provided. These include engaging surfaces configured to bear against and hold the anchor in place. In addition, they include retaining plate 52 positioned to slide over the top of the anchor (in the orientation of the view). A cable receiver 48 is provided in each retaining plate 52 so that the cable itself is free to slide with respect to the anchor clamps.

A pair of cable clamps 44 is provided. Each of these includes a cable receiver 50 that is sized to fit around the cable. The cable clamps are configured to frictionally engage and hold the cable so that they may apply tension to the cable. In order to do this engaging features may be included in the cable receiver. Exemplary engaging features include rubber inserts, ribs, knobs, and knurls. Other ways to apply tension to the cable include applying a temporary anchor to the free end and wrapping a length of the cable around a moveable or driven capstan.

It is important for the present invention to determine when a "defined transition" has taken place in the potting compound (The potting compound in some region of the cavity—such as the distal region—has reached a suitable viscosity or cure state). If the transition of the potting compound to a solid is an exothermic reaction, then the measurement of temperature is a good proxy for actually measuring the viscosity in the distal region. Thus, the embodiment of FIG. 5 includes temperature sensing devices. One or more thermocouples (58, 60, and 62) are installed to monitor the temperature of anchor 18 at various points. These thermocouples are connected to monitoring circuitry which converts their output to a temperature parameter. A single thermocouple will often be sufficient—particularly when the anchor is made of a thermally-conductive metal.

Figure 6:
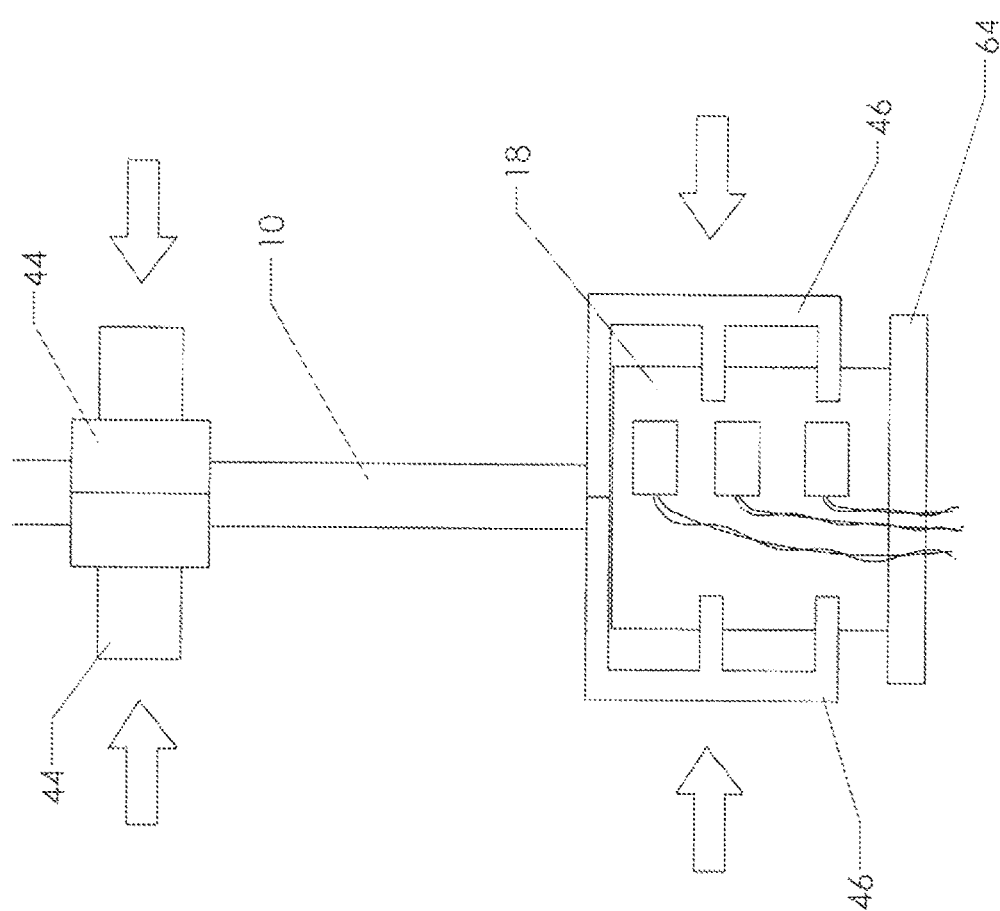
FIG. 6 is an elevation view, showing the components of FIG. 5 clamped to the cable.

FIG. 6 is an elevation view of the assembly of FIG. 5 after the anchor clamps and cable clamps have been clamped inward as indicated by the arrows. In this configuration the anchor is held securely by the two anchor clamps 46 while the cable is held securely by the two cable clamps 44.

Once the components are clamped in place, monitoring begins for the defined transition of the potting compound in the distal region of the expanding cavity. This "defined transition" is the point at which the potting compound in a certain region is at the desired point in its transition toward being a solid such that tension and/or translation may be applied to the cable in order to produce the necessary straightening and improved load distribution results.

Figure 7:
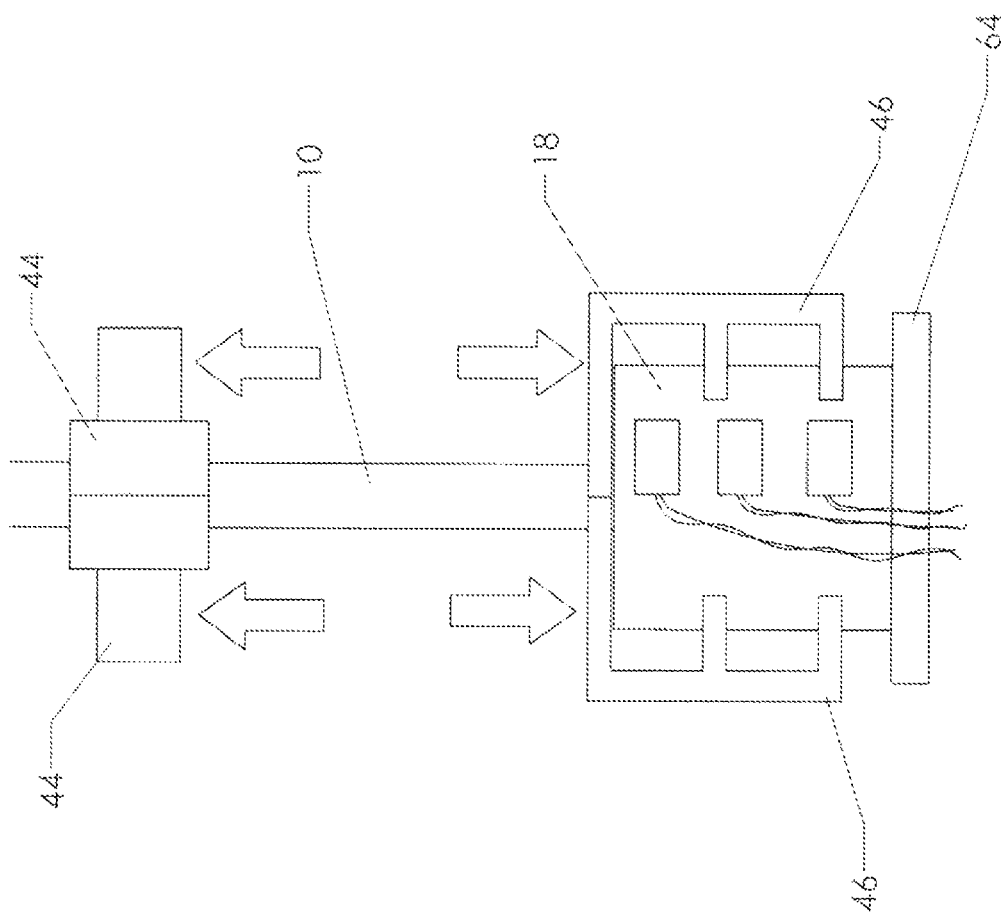
FIG. 7 is an elevation view, showing the components of FIG. 6 applying tension to the cable.

FIG. 7 shows the step of applying tension. Tension may be applied by (1) fixing the anchor position and pulling the cable clamps 44 upward, (2) fixing the cable clamps and pulling the anchor downward, or (3) a combination of the two. When a pulling force is applied, tension in the cable will typically spike and then slack off as the filaments begin to pull through the potting compound. Preferably, further translation of the cable is stopped at this point. Some tension may or may not be continued after translation has stopped.

One of the simplest ways to monitor for the defined transition in the potting compound is to monitor the temperature of the anchor using one or more thermocouples. If the same initial conditions are used (same potting compound at the same initial temperature in the same anchor/cable assembly at the same relative positions), then one may experiment to determine what measured anchor temperature corresponds to the achievement of the defined transition in the potting compound in a desired region such as the distal region.

There are many possible experiments that could be run to evaluate the relationship between the cure state of the potting compound in a certain region and the process parameters for the translation process itself. An example of one of the many possible experiments may be described as follows:

1. Lock the assembly together as in FIG. 6;
2. Monitor the anchor temperature;
3. At a given anchor temperature, apply tension to the cable;

4. If the cable translates too far and/or translates at a very low tension then the experiment is a failure because the defined transition had not yet occurred and one then knows to wait until a higher viscosity cure state is achieved before applying tension;
5. If the cable undergoes a spike in tension when the force is applied and the filaments appear to be dragging slowly through the potting compound, then limit the translation and allow the potting compound to fully cure (in some cases over a day or more);
6. Measure and record the break strength of the termination; and
7. Possibly examine other cable properties such as filament alignment (by sectioning the cable).

One may then compare the ultimate break strength of the termination against the measured temperature at the time tension was applied. One measured temperature (or range thereof) will produce the best result. This measured temperature then corresponds to the defined transition in the desired region of the cavity and it should be used as the trigger point for applying tension to the cable. Once this measure temperature is found, it will remain the same (or very nearly so) for the same combination of all the factors (potting compound, filaments, anchor type, etc.). However, as one would expect, a new experiment will be needed for each different combination. This not only includes the determining the defined transition point, but also the translation process parameters.

In some instance, some or all of the filaments will be pulled completely free of the distal region so that the free ends of these filaments lie closer to the proximal end of the anchor. In other instances, some or all of the filament ends will remain fixed in the distal region and movement is limited to the region of filaments at the proximal end. Depending on the relative lengths of the filaments with the anchor cavity, in some instances some filaments may not be moved at all.

There is a tendency for the applied translation to pull some of the liquid potting compound out the proximal end of the anchor and introduce a void in the distal and/or extended regions of the cavity. For these instances it may be desirable to introduce additional potting compound (or some other filter material) to fill the void.

The operator preferably understands the relationship between the force applied to the cable, the reactive tension with the cable, and the resulting translation. These may be monitored and automated using a computer system to apply the loads, control velocity, measure the reaction forces, and measure the translation distance. Many different approaches to tension and translation are of course possible, including:

1. Ramping up the tension and allowing continued translation;
2. Ramping up the tension at a certain rate until a certain load value (reactive force) or measured distance (displacement) is achieved;
3. A variable tension or velocity curve and limitation on translation;
4. Varying tension to create a desired translation velocity and amount of total translation; and
5. Ramping up the tension on any of the above configurations in stages, and any combination or addition of steps thereof.

In some cases it may be desirable to monitor the temperature of a specific region within the anchor more precisely in order to determine the defined transition. Multiple temperature sensors may be used at different points of the anchor—as actually shown in FIG. 6. One may also use a bore-hole through the side of the anchor so that a temperature sensor can be placed directly adjacent to the curing potting compound. In most cases, however, the temperature rise is fairly gradual and the anchor material is thermally conductive (such as aluminum). In most cases a single temperature for the anchor as a whole will work and the location of the temperature sensor is not overly critical.

The reader should note that the measurement of temperature within the distal region is only exemplary. In some embodiments it may be more important to measure the temperature in the middle region, the neck region, or the transition region. Temperature is really just a proxy for the defined transition (the achievement of a desired potting compound characteristic in a defined region of the anchor), so some experimentation may be needed to determine the best location for the temperature measurement.

Figure 8:
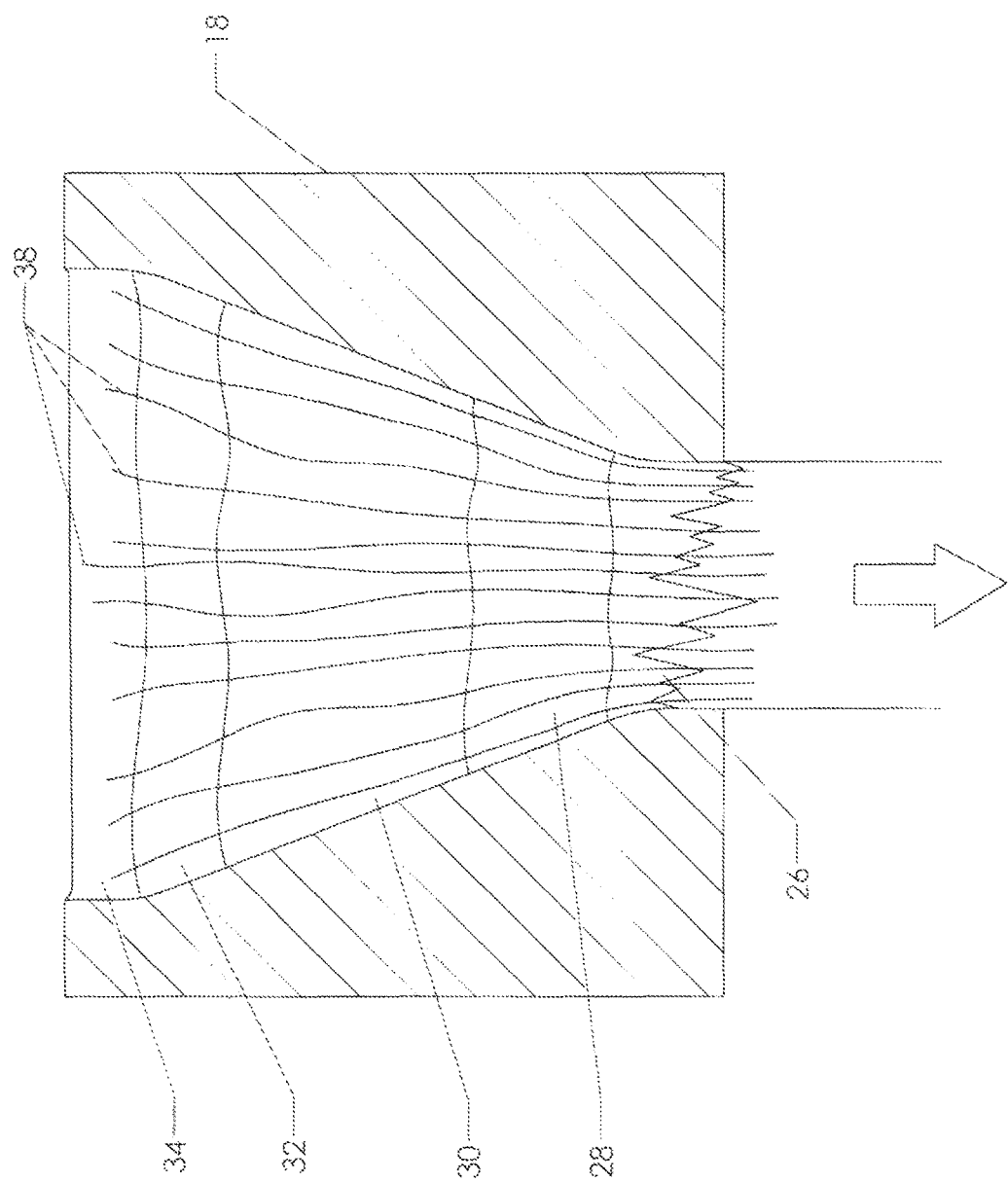
FIG. 8 is a sectional elevation view, showing the filament alignment resulting from the inventive process.

FIG. 8 shows the result of applying the inventive process. The filaments have been pulled some distance through the potting compound while it was solidifying. The filaments are better aligned and they have been given better load distribution. This improvement in load distribution and filament orientation produces the improved termination performance.

The reader will also note that the anchor in FIG. 8 is in an upright position with its distal portion facing upward. The entire potting process may be carried out in this orientation and in fact this gives good access to the distal region. For example, heat lamps or UV lamps may be used in conjunction with hardness or other measurement tools, which may be easily applied to extended region 34 if desired.

The experimental methods described for the embodiments that correlate a measured temperature with the best termination performance may be applied to other measured values as well. As a first additional example, there are devices which measure the dielectric properties of the potting compound as it transitions to a solid state. These measurements may be used to determine the defined initial transition.

As a second additional example, time itself may be correlated to the termination performance. If one has a potting compound and anchor arrangement that allows for a relatively slow cure, and if one carefully controls the conditions (temperature, potting compound mixture ratio etc.) so that they are repeated precisely each time, then the defined transition can occur at the same time in each instance. One may experiment by applying the tension force at various times and correlating the termination performance against the time at which tension was applied. One may experiment by varying other things such as the tension versus time curve, translation limitations, velocity limitations, etc.

As a third additional example one may use an ultra-slow translation process or alternatively stepped micro-translations to determine the time of the defined transition. Once an initial cross-linking has occurred, a controlled tension can be applied and a measuring fixture used to determine the amount of translation resulting from the controlled tension. Increasing viscosity or cure state in a defined region of the cavity can be detected by the reduction in the amount of translation resulting from the application of tension over a limited time. This conclusion would then fix the defined transition.

As a fourth additional example of determining the defined initial transition one may use applied mechanical or electromagnetic waves to the termination assembly and measure the response. This response will change once the potting compound begins its transition to a solid state.

As a fifth additional example, a simple hardness test may be applied to an accessible region of the potting compound.

The distal portion of the cavity is often accessible and a force versus penetration probe or other even simpler means may be used to determine hardness. This type of test may be especially useful in configurations such as an open potted socket where the distal region is exposed.

As a sixth additional example, a viscosity test may be applied to an accessible region of the potting compound. A viscosity measuring device (such as a rotating paddle) can be introduced into the potting compound and used to determine when a desired viscosity has been reached.

As a seventh additional example, micro-translations could be applied at staged intervals. For instance, a 0.5 mm translation could be applied once every 10 minutes.

As an eighth additional example, one could apply variable tension needed to achieve a desired translation velocity. This application would then cease after a desired translation had been achieved.

Figure 9:
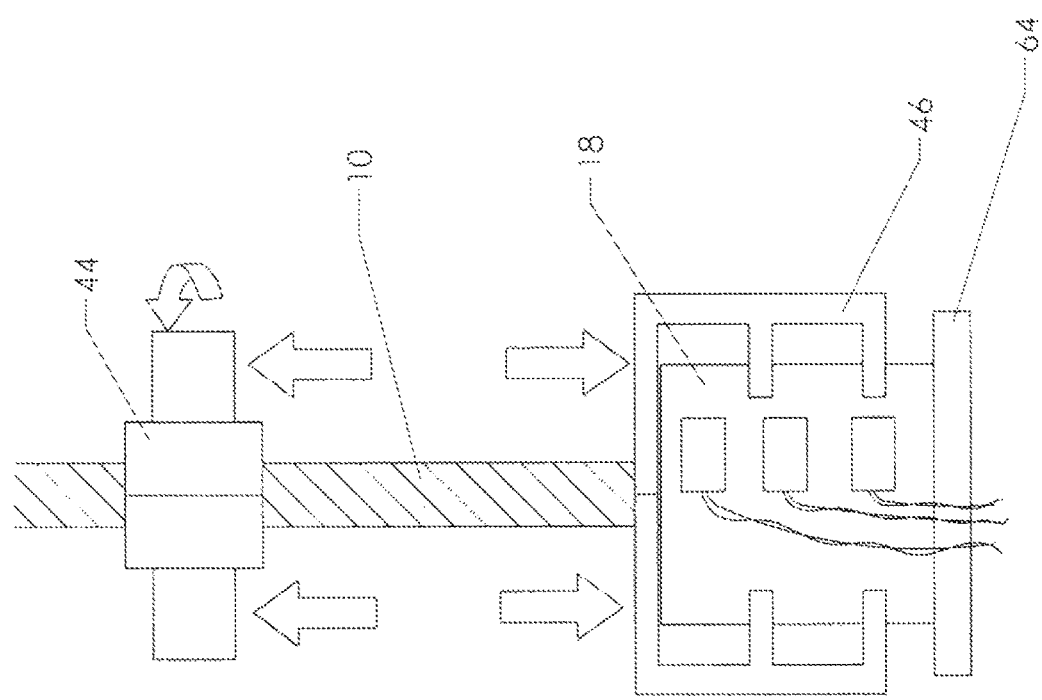
FIG. 9 is an elevation view, showing the addition of a rotational motion during the tension applying process.
Figure 10:
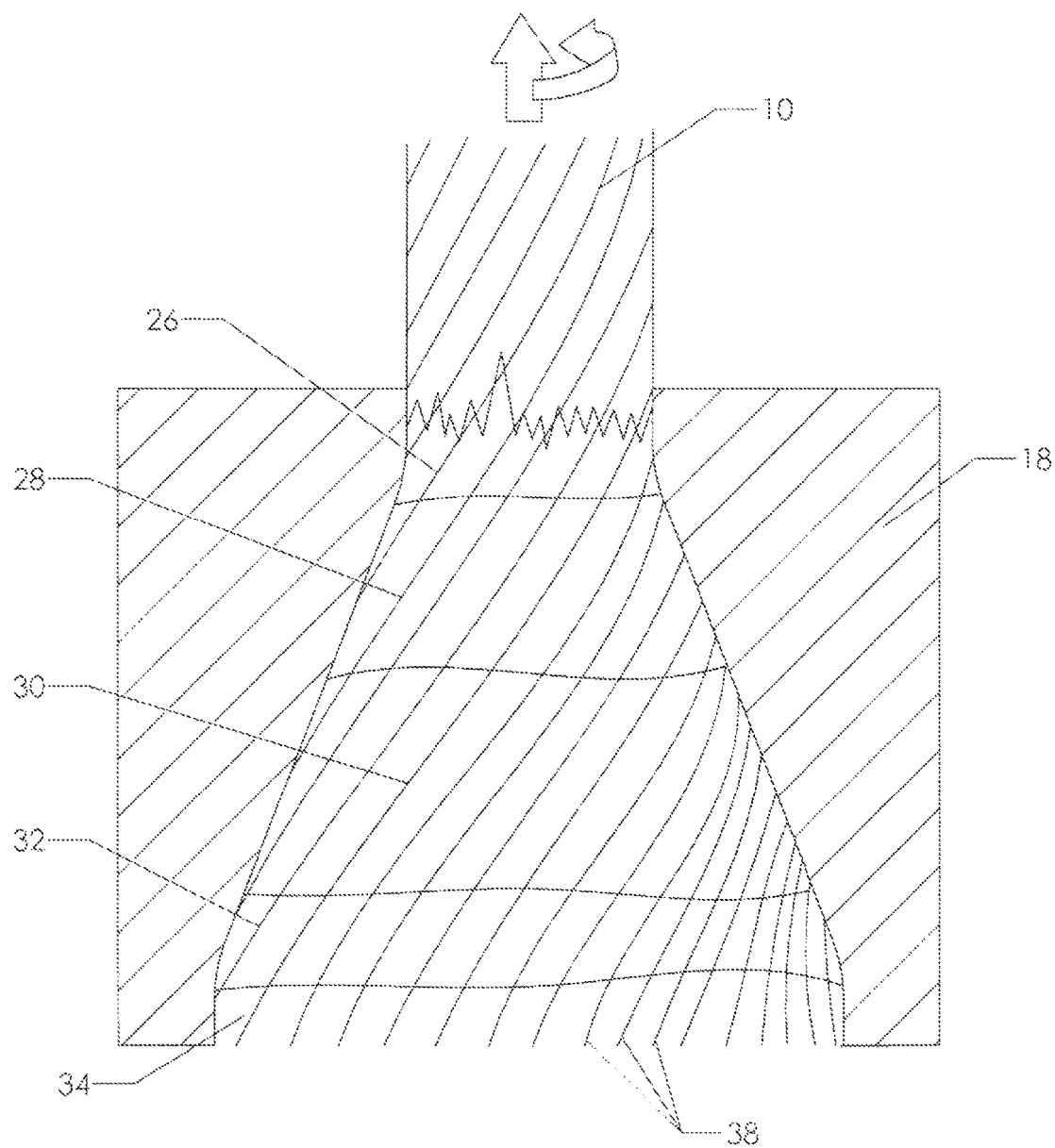
FIG. 10 is a sectional elevation view, showing the filament alignment resulting from the introduction of rotational motion.

Additional steps may be added to the inventive process. FIGS. 9 and 10 show a variation configured for use on a cable having a helical winding. Such a cable has a central axis, but the helically wound filaments are at no point parallel to that axis. They are instead offset by a distance and a helix angle. Such cables are often potted with the filaments lying in an orientation within the anchor cavity that is generally parallel to the cable axis. This fact introduces a bend as the filaments exit the anchor and a resulting stress riser at the point of the bend. In order to reduce this bending transition, the cable may be rotated during the potting process. Preferably this rotation is applied in combination with the application of tension.

FIG. 9 shows the same configuration as FIG. 7. However, in this embodiment, cable clamps 44 are rotated about the cable's central axis while tension is applied. Like the application of tension/translation, the rotation preferably does not commence until after the defined transition of the potting compound within the defined region has commenced. Optionally the rotation could be added before or after the defined transition. Whenever it is applied, the rotation introduces a twist in the filaments within the anchor cavity.

FIG. 10 shows one possible result. The portion of the filaments lying within distal region 32 and extended region 34 have a lesser degree of twist since—in this example—the potting compound was more viscous in these regions when the twist was applied. However, the portion of the filaments lying in the balance of the cavity has been twisted more significantly. Preferably, the amount of rotation is set so that the twist at the transition region 26 approximately matches the helix angle of the filaments in the cable itself. Also important is the fact that the load sharing between the filaments has been more equalized (as explained previously).

Figure 11:
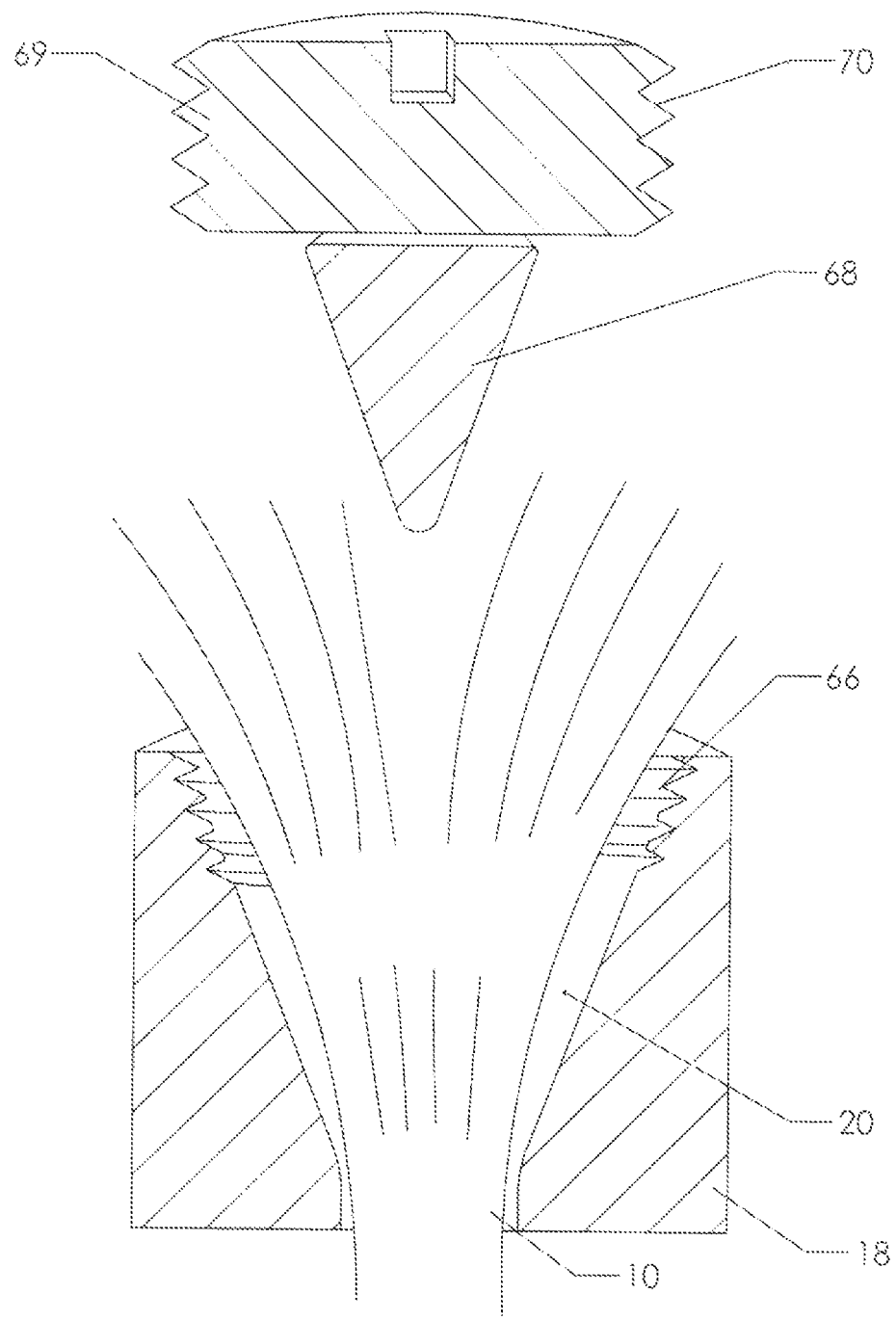
FIG. 11 is a sectional perspective view, showing the use of a spike.
Figure 12:
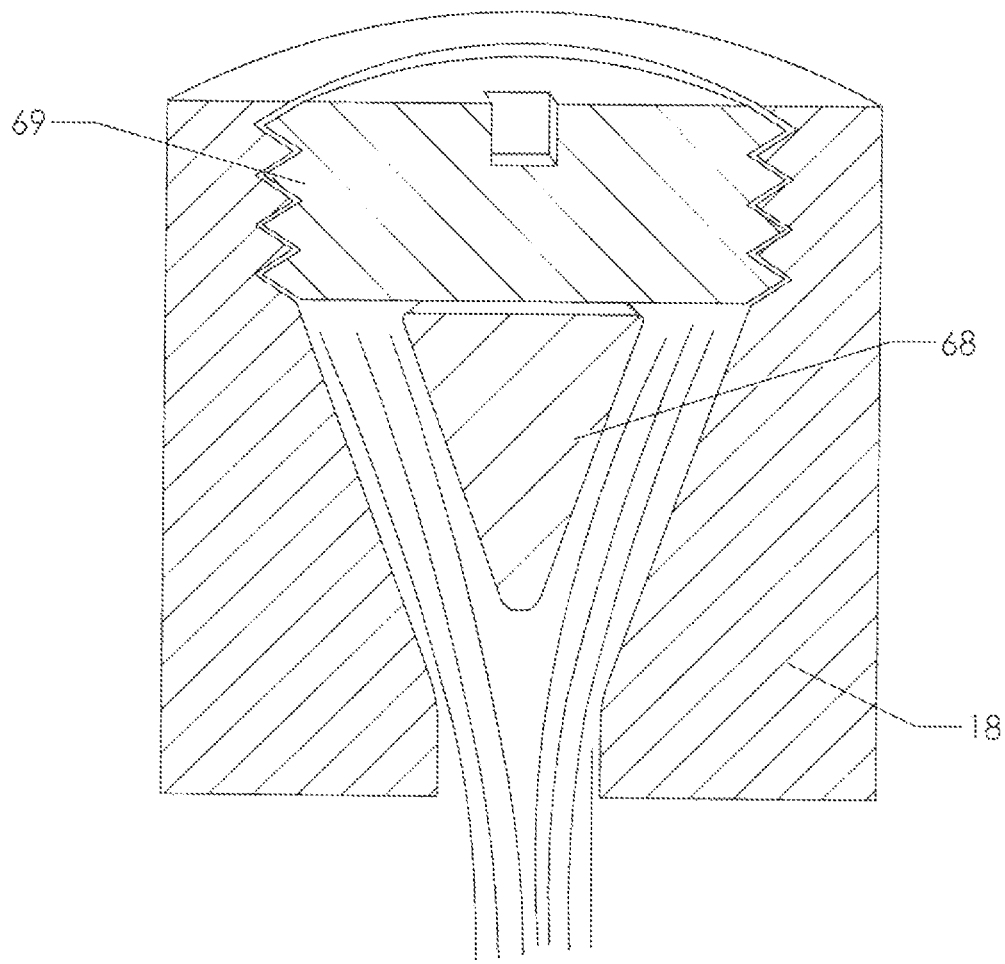
FIG. 12 is a sectional perspective view, showing the assembly of FIG. 11 in a completed state.

Additional components can be added to the anchor assembly in a virtually endless series of combinations. FIGS. 11 and 12 show one example. In FIG. 11 spike 68 is configured to thread into cavity 20 within anchor 18. Male thread 70 on plug 69 is sized to thread into female thread 66 on the upper portion of the anchor. The plug is used to tighten the spike so that the filaments within the cavity are mechanically held.

FIG. 12 shows the result once spike 68 is in place. The same process has been applied. A defined transition was detected and tension/translation was then applied to the cable to align the filaments in the regions while they were still able to move within the potting compound. In this embodiment the cavity defined by the inward-facing anchor wall and the outward-facing wall of the spike has been filled with potting compound. In many instances where a spike is used in a tapered cavity (sometimes called a "spike-and-cone") potting compound will not be used and the filaments will instead be held in place by the mechanical interlock of the spike-and-cone itself.

Figure 13:
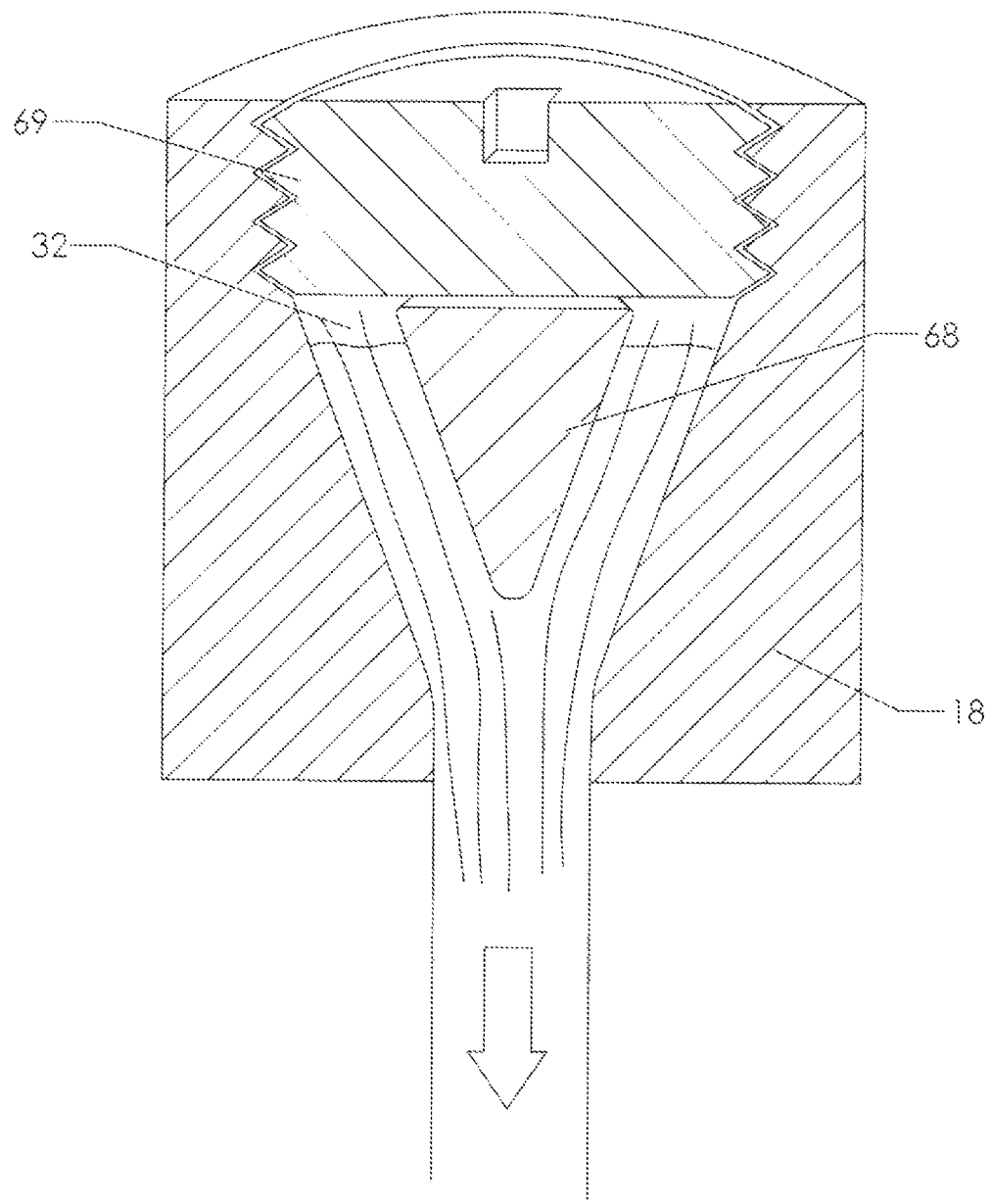
FIG. 13 is a sectional perspective view, showing a spike and cone embodiment in which only a small region of potting compound is used and the filaments are ultimately secured in the anchor using a mechanical interlock.

FIG. 13 shows one example of how the present invention can be applied to a spike-and-cone termination that relies primarily on a mechanical interlock to secure the filaments. A small amount of liquid potting compound is provided to form distal region 32. Once the potting compound in this region has undergone the defined transition, tension is applied to cable 10 in order to straighten and align the filaments.

The reader will note that spike 68 at this point is not fully threaded into anchor 18. Thus, the application of tension to the cable is able to straighten the filaments because they have not yet been fully mechanically clamped in place. In the embodiment shown, tension/translation is maintained on the cable while spike 68 is tightened into its final position. Thus, the filaments are held in the desired orientation while they are mechanically clamped in place by the cone. It should be noted that the potting compound and inventive method could be carried out in the neck, middle, distal regions, and in some cases the entire cavity. The ideal placement of potting compound will vary by anchor or termination design—which could take on any shape or form.

Figure 14:
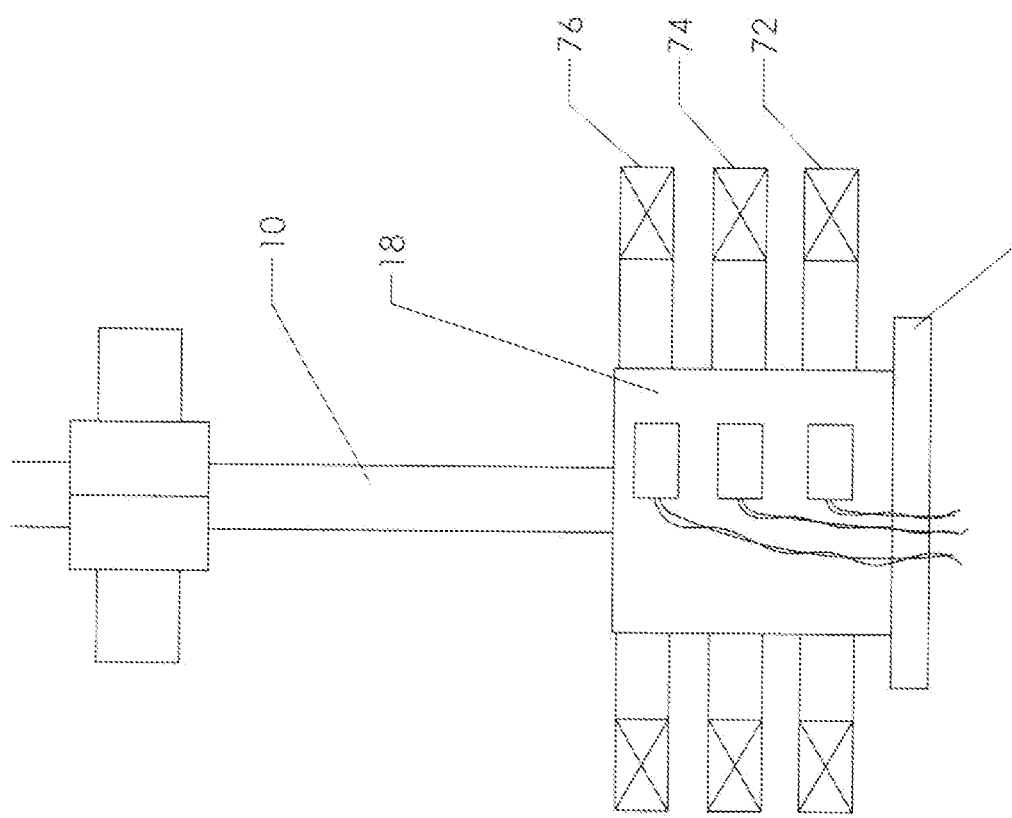
FIG. 14 is an elevation view, showing the addition of multiple heating units to the inventive process.

FIG. 14 shows still another embodiment in which external heating is applied to the anchor during the curing process. One or more heaters (72, 74, and 76) may be placed in any suitable location relative to anchor 18. These apply heat to the anchor in order to raise the temperature of the potting compound in certain regions and thereby control or modify the setting process. As can be imagined, these heating devices can be applied to any desired portion and could even be included in the anchor hardware itself. The defined transition could still be determined by monitoring for temperature in this embodiment. On the other hand, experimentation could be performed to fix the defined transition as a function of the heat applied. In that case, temperature monitoring might not be necessary and one could simply fix the defined initial transition on the basis of the heat applied.

One could also inject catalyzing agents to selectively increase the viscosity or cure state in one region versus another. As an example, a needle can be placed within a portion of the cavity and used to inject additional catalyst into a two-part epoxy so that the viscosity in that region would rise more rapidly.

One could also add other materials to affect heat generation and transfer. If, for instance, one part of the anchor is surrounded by a material having reduced thermal conductivity while another is not, an enhanced temperature difference may be created.

The invention capitalizes on the fact that the potting compound in the cavity tends to transition to a solid more quickly in the distal region than in the neck region. In many embodiments the appropriate difference in cure rate will occur naturally and the proper application of the invention depends mostly on determining when the defined transition in the defined region occurs. However, in other cases it may be necessary to force a desired temperature or cure-rate difference. This can be created by the application of heating, cooling or both. As an example, a heating jacket could be placed around the distal region of the anchor itself while a cooling jacking is placed around the neck region. Passages for a circulating heating or cooling liquid could also be provided in the anchor itself. It is also possible to provide a potting compound with different mix ratios so that one portion cures faster than the other even under identical conditions.

Those skilled in the art will know that differing cure rates can be produced in some potting compounds by the introduction of UV light, ultrasonic vibration, and certain gases. The invention is by no means limited to temperature-induced differences.

Figure 15:
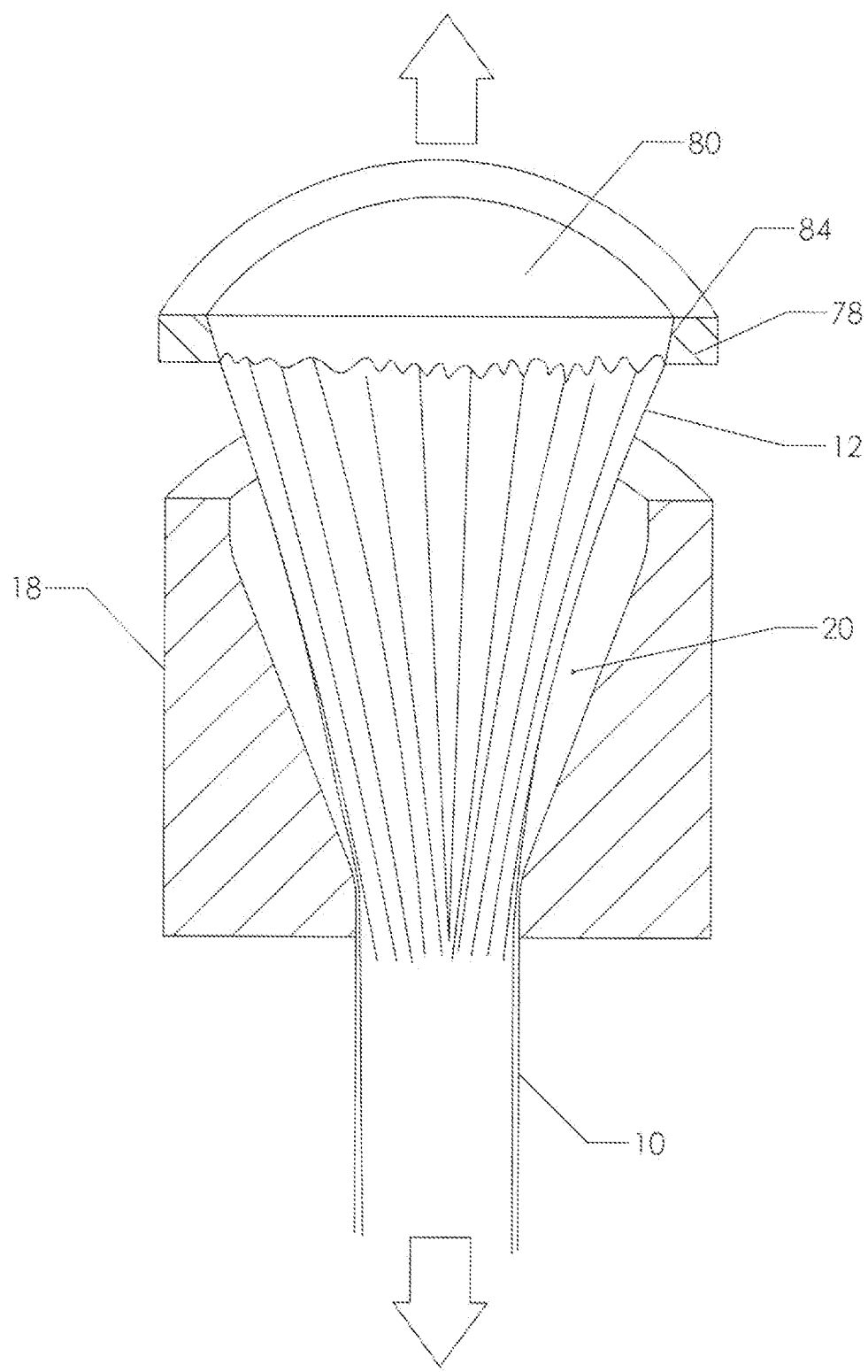
FIG. 15 is a sectional perspective view, showing the use of an auxiliary potted region to align the filaments within an anchor cavity.
Figure 16:
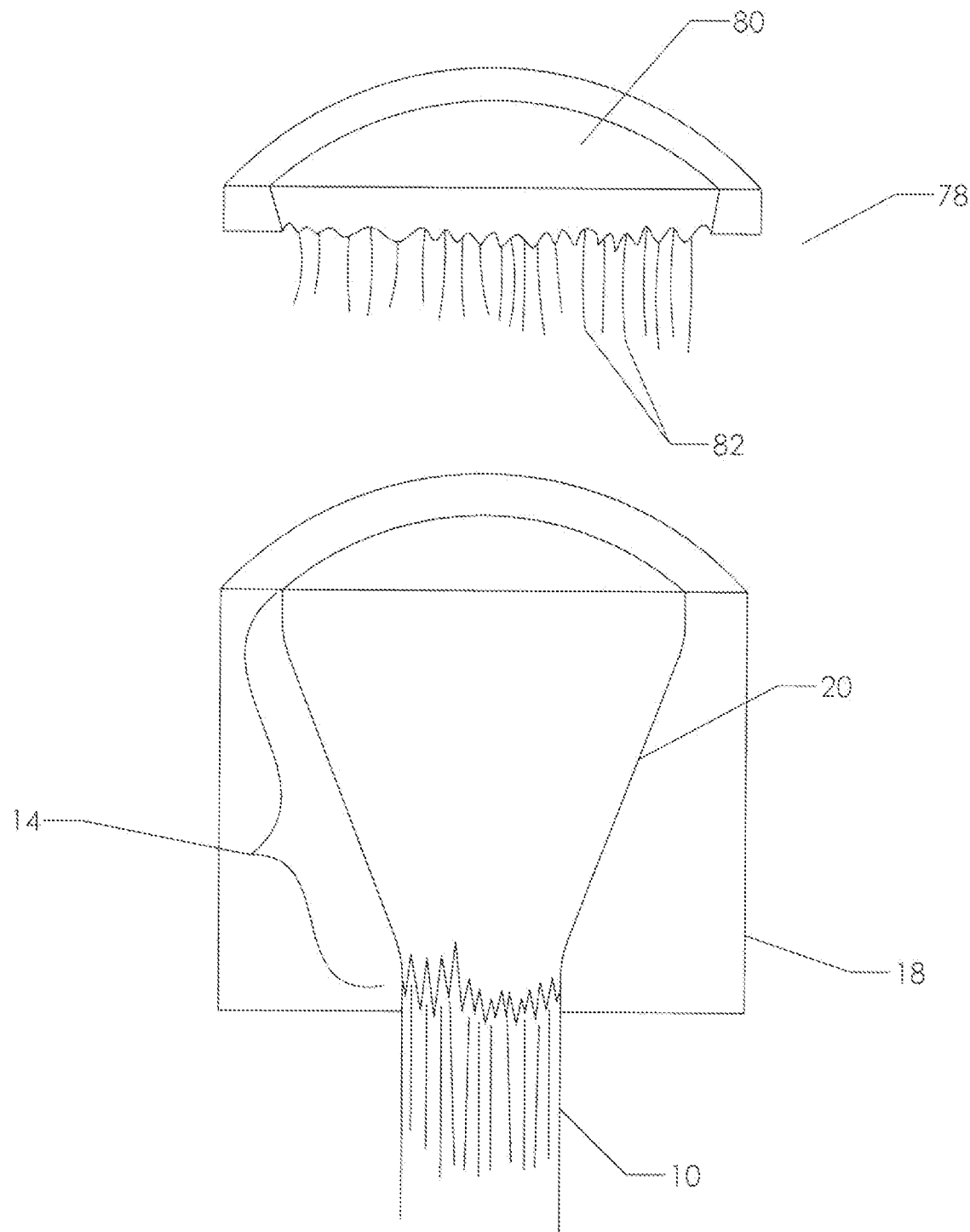
FIG. 16 is a sectional perspective view, showing a completed anchor made using the technique shown in FIG. 15.

In still other embodiments the distal potted region that is used to secure the filaments so that tension can be applied may be located outside of the anchor. As with the spike and cone example in FIG. 12, the inventive process can be carried out solely as a means for improving fiber alignment, and the potting compound may not actually be the load-transfer device itself. FIGS. 15 and 16 illustrate this concept. FIG. 15 is a section view showing the use of auxiliary anchor 78. The filaments are passed through cavity 20 in anchor 18 and potted into auxiliary cavity 84 in auxiliary anchor 78 to form auxiliary potted region 80. The potting compound within auxiliary potted region 80 is allowed to harden sufficiently to hold the filaments in place. Tension is then applied to cable 10 as shown—while anchor 18 is held in the desired relationship. The filaments within cavity 20 are thereby straightened and aligned. Liquid potting compound within cavity 20 (which has been introduced at any suitable time) is allowed to transition to the solid state, preferably while tension is maintained on the cable.

Once the potting compound within cavity 20 has transitioned sufficiently to a solid state, auxiliary anchor may be optionally removed by severing the exposed filaments. The result is shown in FIG. 16. Of course if the ends of the filaments have been pulled completely through this region then fiber severing will not be necessary. Auxiliary anchor may at this point be discarded and the completed termination on the cable put to use. Those skilled in the art would realize the auxiliary anchor or cavity method could be carried out in many possible geometries and configurations, and benefit almost any form of synthetic multi-filament termination method.

The auxiliary anchor could also be formed as an extension of the anchor itself. The potting compound within the auxiliary anchor might be a wax. The potting compound in the cavity of the anchor itself might be a two-part epoxy. After the filament alignment is carried out and after the potting compound in the anchor has set, the wax in the auxiliary anchor portion could be removed by melting. The distal end of the anchor might then be subjected to a secondary operation such as grinding to produce a smooth surface finish. In this configuration the wax may alternately be cooled during the process to create the necessary hardness for translation, where the potting compound in the anchor cavity is used to permanently lock the tensioned strands in the cured state. As covered previously, any potting compound could undergo heating or cooling to achieve the desired cure state or viscosity for the inventive method. While epoxies and other cross linking materials tend to turn harder with heat, waxes and thermoplastics for example may require heat to lower initial viscosity, and may also benefit from cooling to provide the harder cure state or viscosity. While the majority of the disclosure examples focused on cross linking materials and processes, this is by no means limiting. The invention similarly applies to these non-cross-linking materials and processes that would relate to such materials for achieving the same outcome.

Although the preceding description contains significant detail, it should not be construed as limiting the scope of the invention but rather as providing illustrations of the preferred embodiments of the invention. Those skilled in the art will be able to devise many other embodiments that carry out the present invention. Thus, the language used in the claims shall define the invention rather than the specific embodiments provided.

Having described my invention, we claim:

1. A method for adding a termination to an end of a tensile strength member made up of multiple synthetic filaments, said tensile strength member having a central axis, comprising:
   a. providing an anchor with a proximal end, a distal end, and a cavity;
   b. said cavity including a distal region and a neck region;
   c. providing a potting compound in a liquid state, said potting compound being configured to transition to a solid state over time;
   d. placing a length of said filaments within said cavity;
   e. adding said potting compound in said liquid state to said cavity;
   f. monitoring for a defined transition of said potting compound from said liquid state toward said solid state; and
   g. upon detecting said defined transition and while at least a portion of said potting compound has not yet transitioned to said solid state, applying tension to said tensile strength member.

2. A method for adding a termination to an end of a tensile strength member as recited in claim 1, further comprising after said step of applying tension to said tensile strength member, monitoring a translation of said tensile strength member relative to said cable and limiting said translation to a defined maximum translation.

3. A method for adding a termination to an end of a tensile strength member as recited in claim 1, wherein said step of monitoring for a defined transition of said potting compound in said cavity is carried out by monitoring a temperature of said potting compound in said cavity.

4. A method for adding a termination to an end of a tensile strength member as recited in claim 1, wherein said step of monitoring for a defined transition of said potting compound in said cavity is carried out by monitoring a temperature of said anchor.

5. A method for adding a termination to an end of a tensile strength member as recited in claim 1, further comprising upon detecting said defined transition pulling said tensile member through a defined linear translation along said central axis of said tensile strength member.

6. A method for adding a termination to an end of a tensile strength member as recited in claim 1, further comprising upon detecting said defined transition rotating said tensile strength member around said central axis.

7. A method for adding a termination to an end of a tensile strength member as recited in claim 6, further comprising upon detecting said defined transition rotating said tensile strength member around said central axis.

8. A method for adding a termination to an end of a tensile strength member as recited in claim 1, further comprising introducing a spike into said cavity while said potting compound is in said liquid state.

9. A method for adding a termination to an end of a tensile strength member as recited in claim 1, further comprising orienting said tensile strength member and said anchor so that said neck region of said cavity lies above said distal region of said cavity before said potting compound transitions completely to said solid state.

10. A method for adding a termination to an end of a tensile strength member as recited in claim 9, further comprising placing a seal plate across said distal region of said cavity.

11. A method for adding a termination to an end of a tensile strength member made up of multiple synthetic filaments, said tensile strength member having a central axis, comprising:
a. providing an anchor with a proximal end, a distal end, and a cavity;
b. said cavity including a distal region and a neck region;
c. providing a potting compound in a liquid state, said potting compound being configured to transition to a solid state over time;
d. placing a length of filaments and said potting compound in said cavity;
e. determining when said potting compound in said cavity is undergoing a defined transition toward said solid state; and
f. upon detecting said defined transition applying tension to said tensile strength member.

12. A method tor adding a termination to an end of a tensile strength member as recited in claim 11, further comprising after said step of applying tension to said tensile strength member, maintaining said tension on said tensile member until all of said potting compound has transitioned to said solid state.

13. A method for adding a termination to an end of a tensile strength member as recited in claim 11, wherein said step of monitoring for a defined transition of said potting compound is carried out by monitoring a temperature of said potting compound in said distal region.

14. A method for adding a termination to an end of a tensile strength member as recited in claim 11, wherein said step of monitoring for a defined transition of said potting compound in said cavity is carried out by monitoring a temperature of said anchor.

15. A method for adding a termination to an end of a tensile strength member as recited in claim 11, further comprising upon detecting said defined transition pulling said tensile member through a defined linear translation along said central axis of said tensile strength member.

16. A method for adding a termination to an end of a tensile strength member as recited in claim 11, further comprising upon detecting said defined transition rotating said tensile strength member around said central axis.

17. A method for adding a termination to an end of a tensile strength member as recited in claim 16, further comprising upon detecting said defined transition rotating said tensile strength member around said central axis.

18. A method for adding a termination to an end of a tensile strength member as recited in claim 11, further comprising introducing a spike into said cavity while said potting compound is in said liquid state.

19. A method for adding a termination to an end of a tensile strength member as recited in claim 11, further comprising orienting said tensile strength member and said anchor so that said neck region of said cavity lies above said distal region of said cavity before said potting compound transitions completely to said solid state.

20. A method for adding a termination to an end of a tensile strength member as recited in claim 19, further comprising placing a seal plate across said distal region of said cavity.

21. A method for adding a termination to an end of a tensile strength member as recited in claim 11, further comprising:
a. after said potting compound has transitioned to said solid state, removing said anchor; and
b. securing a second anchor around said potting compound in said solid state.

22. A method for adding a termination to an end of a tensile strength member as recited in claim 12, further comprising:
a. after said potting compound has transitioned to said solid state, removing said anchor; and
b. securing a second anchor around said potting compound in said solid state.

23. A method for adding a termination to an end of a tensile strength member as recited in claim 13, further comprising:
a. after said potting compound has transitioned to said solid state, removing said anchor; and
b. securing a second anchor around said potting compound in said solid state.

24. A method for adding a termination to an end of a tensile strength member as recited in claim 14, further comprising:
a. after said potting compound has transitioned to said solid state, removing said anchor; and
b. securing a second anchor around said potting compound in said solid state.

25. A method for adding a termination to an end of a tensile strength member as recited in claim 15, further comprising:
a. after said potting compound has transitioned to said solid state, removing said anchor; and
b. securing a second anchor around said potting compound in said solid state.

* * * * *